April 19, 1966  L. A. HUMPHREY  3,246,521
PORTABLE TEMPERATURE MEASURING DEVICE
Filed May 3, 1963
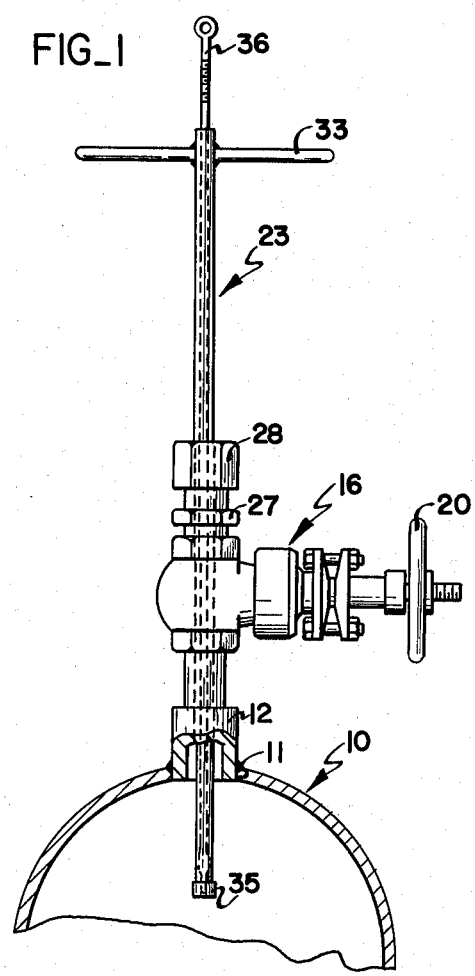
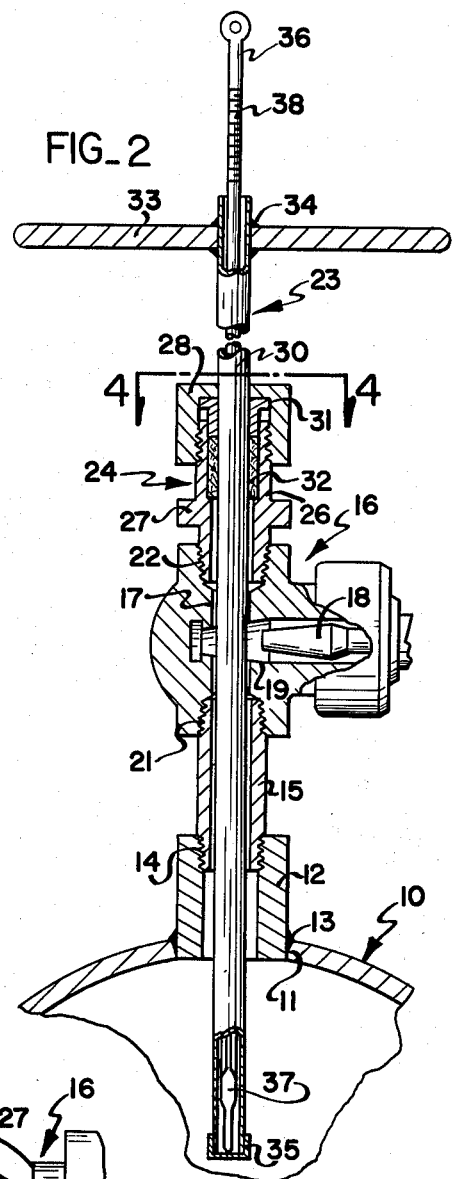
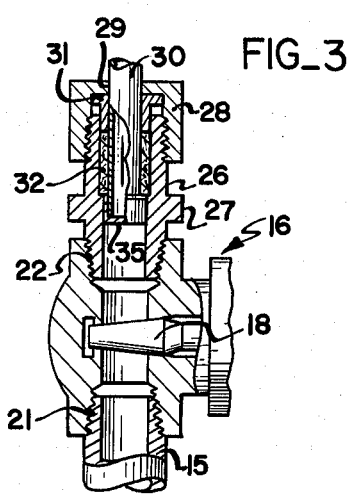
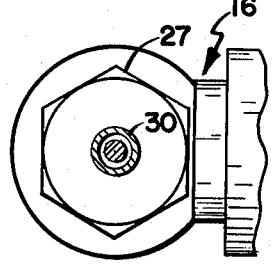
INVENTOR.
LOWELL A. HUMPHREY
BY
Oberlin, Maky & Donnelly
ATTORNEYS United States Patent Office 3,246,521
Patented Apr. 19, 1966

3,246,521
PORTABLE TEMPERATURE MEASURING
DEVICE
Lowell A. Humphrey, Williston, Ohio, assignor to The Standard Oil Company, Cleveland, Ohio, a corporation of Ohio
Filed May 3, 1963, Ser. No. 277,811
5 Claims. (Cl. 73—374)

This invention relates in general to a temperature measuring device and more particularly, as indicated, to a portable temperature measuring device for measuring internal temperatures of fluids in pipes or vessels. It should be understood that although the term fluid is employed throughout to provide consistency and to avoid confusion, the present invention can accurately measure the temperature of solids as well, as will become evident as the description proceeds.

It is often desirable and even necessary to accurately determine the temperature of fluids in pipes or vessels under the same conditions as exist within their such enclosures and for such purpose thermowell units are commonly used with quite satisfactory results. Such units, however, are generally permanently installed and accordingly constitute a considerable expense where operations require that a relatively large number of these units be provided.

It is an object of the present invention to provide a portable temperature measuring device the construction of which can be quickly and easily mounted on or removed from the usual type of valved connections for pipes and vessels, which connections are normally present for control of the fluid flow.

A further object of the present invention is to provide a portable temperature measuring device which is capable of withstanding very high pressures. A more specific object resides in providing a temperature measuring device having a temperature sensing element which is not directly contacted by the fluid the temperature of which is to be accurately measured.

A further object of the present invention is to provide a portable temperature measuring device capable of accurately determining the temperature of a fluid whether it be a liquid or a gas and whether such fluid is confined within said vessel or under flow conditions in said pipe.

These and other objects of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is an elevational view of the temperature measuring device mounted in operative position on a pipe or vessel, with certain parts being shown in section;

FIG. 2 is an enlarged longitudinal sectional view of this temperature measuring device as thus mounted;

FIG. 3 is a fragmentary view of a portion of the FIG. 2 assembly, with the temperature measuring device, however, shown in another position; and FIG. 4 is a sectional view taken on lines 4—4 of FIG. 2.

Referring now in more detail to the drawings, wherein like parts have been indicated by like reference numerals, there is fragmentarily illustrated at 10 a shell of a vessel or pipe, the shell 10 being provided with a circular opening 11 in its wall. It should be understood that, as indicated, the shell 10 is intended throughout this disclosure to represent either a vessel containing fluid the temperature of which is desired to be measured or a pipe through which the fluid flows. A cylindrical coupling 12 is rigidly secured to the shell 10 in the opening 11, preferably by welding as indicated at 13. The coupling 12 is internally threaded as indicated at 14 for receiving at its outer end a nipple 15 both ends of which are provided with external threads, with the opposite outer end thereof threadedly supporting a gate valve generally indicated at 16. The gate valve 16 forms no part of the present invention and merely exemplifies one type of commonly used valve with which the temperature measuring device of the invention can be employed for measuring the temperature of the fluid within the shell 10. The gate valve 16 thus comprises a transversely extending bore 17 which can be partially or entirely closed by a longitudinally movable generally conical shaped valve member 18 adapted to seat on valve seat 19 in the usual manner, the valve member 18 being axially movable by means of a hand wheel 20. The gate valve 16 further includes threaded openings 21 and 22, the former receiving the outer end of the nipple as above explained, and the latter normally receiving either a threaded fill pipe (not shown) for filling the vessel through the valve or a threaded cap or plug (not shown) for sealing the valve.

The temperature measuring device of the present invention is generally indicated at 23 and is operatively mounted on the gate valve 16 by means of a packing gland generally indicated at 24. It will be understood that when the temperature of the fluid in shell 10 is to be accurately measured, the fill pipe or cap, whichever the case may be, will be removed thereby readying the gate valve for mounting of the packing gland. The packing gland 24 comprises a body portion 26 having a hexagonal shaped, wrench engaging portion 27 preferably integrally formed therewith, and a packing nut 28 threaded on the opposite end of the body 26. The packing nut 28 is formed with a central opening 29 for passage therethrough of the temperature sensing device 23. Disposed within the body 26, and around cylindrical housing 30 of the temperature sensing device 23, is a metal sleeve 31 and a sleeve 32 of packing material, these sleeves 31 and 32 permitting the temperature sensing device 23 to move axially relative thereto. The packing material 32 serves to frictionally retain the temperature measuring device in its adjusted position and to seal the packing gland from fluid flow outwardly thereof. It will thus be seen that the packing gland 24 comprises a relatively few parts and can be easily and quickly mounted on and removed from the gate valve 16.

The temperature measuring device 23 comprises, in addition to the cylindrical housing 30 noted above, a handle 33 welded to the cylinder 30 adjacent one end thereof, as indicated at 34, and a cup-shaped stop member and end closure 35 on the opposite or inner end of the cylinder 30, the closure 35 being secured to such end in any suitable manner and forming with the cylinder 30 a closed-end thermometer well. A thermometer 36 is inserted in this thermometer well, with the thermometer 36 provided with a usual bulb portion 37 disposed adjacent the bottom thereof. The sealed end of the thermometer well 30, 35 of course prevents the fluid within the shell 10 from directly contacting the bulb 37, whereby the device is capable of withstanding very high pressures. The opposite outer end of the thermometer 36 extending beyond the exposed end of the housing 30 is provided with suitable indicia as indicated at 38 for reading whereby the temperature of the fluid within the shell 10 as sensed by the bulb 37. It should be understood that the pencil type thermometer 36 is illustrative only and that other type thermometers or thermocouples could also be employed.

Referring to FIG. 3, to use the temperature measuring device 23, the handle 33 is withdrawn until the end closure 35 contacts the packing sleeve 32. The packing gland 24 is then threaded on the gate valve 16 as previously described, the gate valve at this time being in a closed position by prior manipulation of the valve member 18. The gate valve 16 is thereafter opened by the hand wheel 20 to permit the thermometer well housing 30 to be advanced through the gate valve 16 to its illustrated operative position within the shell 10. The thermometer 36 is then inserted into this now effective well as previously explained.

When it is desired to remove the temperature measuring device subsequent to obtaining the desired fluid temperature data, the thermometer 36 is removed and the well housing 30 retracted until the end member 35 engages the packing sleeve 32 as above described. The gate valve 16 is then closed and the packing gland 24 removed from the gate valve 16. The threaded opening 22 can then be capped or plugged as previously described.

It will thus be seen that the invention provides a portable measuring device which can quickly and easily be mounted on or removed from a gate or similar valve connection for measuring the temperature of fluid enclosed within a vessel or other container without limitation as to internal pressure and other possibly severe conditions which would normally require complex and relatively expensive constructions. Moreover, one such device can be used to repeated advantage to accurately measure fluid temperature in a great many enclosures, thereby very substantially reducing the normal equipment cost.

Other modes of applying the principle of the invention may be employed, change being made as regards the details described, provided the features stated in any of the following claims or the equivalent of such be employed.

I, therefore, particularly point out and distinctly claim as my invention:

1. A portable temperature measuring device for measuring the temperature of a fluid as contained within an enclosure, comprising an elongated housing closed at one end, valve means connected to said enclosure, said valve means including means movable between an open position affording access to the enclosure through said valve means and a closed position shutting off access to said enclosure, means for removably advancing said housing through said valve means in sealed relation, the closed end of the housing being at the inner end as thus advanced and the housing imperforate outwardly to the area of sealing such penetration thereof, and temperature sensing and indicating means extending from the exterior of the enclosure to the inner end portion of the inserted housing for measurement of the temperature at such interior region without exposure of the sensing means to the conditions within the enclosure.

2. A device as set forth in claim 1 wherein the housing is in assembled relation to sealing and coupling means therefor, with such assembly being detachable from the valve means as a unit upon withdrawal of the housing and closure of the valve means.

3. The device of claim 2 further including stop means for limiting withdrawal of said housing from said coupling means.

4. The device of claim 3 wherein said coupling means includes a packing through which the housing is axially movable and the inner end of the housing is formed with a stop engageable on withdrawal with said packing, thereby normally to preclude full removal of the housing, the coupling means being of such formation as to permit closure of the valve means to seal the access therethrough to the vessel interior upon such withdrawal of the housing to the thus arrested position of the same, whereby the device can be uncoupled and removed.

5. The device of claim 2 wherein said means for advancing and withdrawing the housing comprises handle means at the outer end thereof.

References Cited by the Examiner
UNITED STATES PATENTS

| | | | |
|---|---|---|---|
| 490,723 | 1/1893 | Roney | 73—375 |
| 1,384,132 | 7/1921 | Holm | 73—343 |
| 2,234,056 | 3/1941 | Moore | 73—343 |

ISAAC LISANN, *Primary Examiner.*